(12) United States Patent
Kakadjian et al.

(10) Patent No.: US 9,464,504 B2
(45) Date of Patent: Oct. 11, 2016

(54) ENHANCING DELAYING IN SITU GELATION OF WATER SHUTOFF SYSTEMS

(75) Inventors: Sarkis R. Kakadjian, San Antonio, TX (US); Frank Zamora, San Antonio, TX (US)

(73) Assignee: LUBRIZOL OILFIELD SOLUTIONS, INC., Wickliffe, OH (US)

( * ) Notice: Subject to any disclaimer, the term of this patent is extended or adjusted under 35 U.S.C. 154(b) by 169 days.

(21) Appl. No.: 13/102,053

(22) Filed: May 6, 2011

(65) Prior Publication Data

US 2012/0279727 A1    Nov. 8, 2012

(51) Int. Cl.
| | |
|---|---|
| E21B 33/138 | (2006.01) |
| C09K 8/508 | (2006.01) |
| C09K 8/512 | (2006.01) |

(52) U.S. Cl.
CPC .......... *E21B 33/138* (2013.01); *C09K 8/5083* (2013.01); *C09K 8/512* (2013.01)

(58) Field of Classification Search
CPC ... C09K 8/5083; C09K 8/512; E21B 33/138; E21B 33/12
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,615,794 A * | 10/1971 | Nimerick | 523/130 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,009,755 A * | 3/1977 | Sandiford | 166/270 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |

(Continued)

OTHER PUBLICATIONS

U.S. Appl. No. 13/117,304, filed May 27, 2011, Falana et al.

(Continued)

*Primary Examiner* — Doug Hutton, Jr.
*Assistant Examiner* — Silvana Runyan
(74) *Attorney, Agent, or Firm* — Robert W. Strozier (57) ABSTRACT

Gel compositions include a high molecular weight water-soluble acrylamide polymer, a crosslinking system capable of crosslinking the polymer, a crosslink delay system and an aqueous solvent. The gel compositions are prepared at the surface and injected into a zone of a formation assessable by a wellbore to form a continuous single-phase gel. The gel compositions may be tailored to a specific formation by predetermining gelation rate, gel strength and/or gel stability to form gels having predetermined properties suitable for the zone.

23 Claims, 5 Drawing Sheets

(56) References Cited

U.S. PATENT DOCUMENTS

| | | | |
|---|---|---|---|
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,683,949 A * | 8/1987 | Sydansk et al. | 166/270 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,744,418 A * | 5/1988 | Sydansk | 166/270 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Synder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,189,615 B1 * | 2/2001 | Sydansk | 166/270 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.1 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | 166/372 |
| 7,566,686 B2 | 7/2009 | Kippie et al. | 507/213 |
| 7,712,535 B2 | 5/2010 | Venditto et al. | 166/308.2 |
| 7,767,628 B2 | 8/2010 | Kippie et al. | 507/102 |
| 7,829,510 B2 | 11/2010 | Gatlin et al. | 507/277 |
| 7,886,824 B2 | 2/2011 | Kakadjian et al. | 166/308.2 |
| 7,915,203 B2 | 3/2011 | Falana et al. | 507/136 |
| 7,932,214 B2 | 4/2011 | Zamora et al. | 507/202 |
| 7,942,201 B2 | 5/2011 | Ekstrand et al. | 133/246 |
| 7,956,017 B2 | 6/2011 | Gatlin et al. | 166/280.2 |
| 7,956,217 B2 | 6/2011 | Falana et al. | 562/572 |
| 7,971,659 B2 | 7/2011 | Gatlin et al. | 510/492 |
| 7,989,404 B2 | 8/2011 | Kakadjian et al. | 507/261 |
| 7,992,653 B2 | 8/2011 | Zamora et al. | 175/65 |
| 8,011,431 B2 | 9/2011 | van Petegen | 166/270 |
| 8,012,913 B2 | 9/2011 | Gatlin et al. | 507/239 |
| 8,028,755 B2 | 10/2011 | Darnell et al. | 166/379 |
| 8,034,750 B2 | 10/2011 | Thompson et al. | 507/273 |
| 8,065,905 B2 | 11/2011 | Sweeney et al. | 73/49.1 |
| 8,084,401 B2 | 12/2011 | Lukocs et al. | 507/238 |
| 8,093,431 B2 | 1/2012 | Falana et al. | 564/471 |
| 8,097,567 B2 | 1/2012 | Wilson, Jr. | 507/131 |
| 8,099,997 B2 | 1/2012 | Curr et al. | 73/49.5 |
| 8,141,661 B2 | 3/2012 | Kakadjian et al. | 175/69 |
| 8,158,562 B2 | 4/2012 | Wilson, Jr. et al. | 507/203 |
| 8,172,952 B2 | 5/2012 | Wanner et al. | 134/22.11 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |

(56) References Cited

U.S. PATENT DOCUMENTS

| | | | |
|---|---|---|---|
| 2005/0269080 A1* | 12/2005 | Cowan | 166/250.14 |
| 2006/0194700 A1 | 8/2006 | Gatlin et al. | 507/203 |
| 2008/0251252 A1 | 10/2008 | Schwartz | 507/238 |
| 2008/0318812 A1 | 12/2008 | Kakadjian et al. | 507/219 |
| 2009/0250659 A1 | 10/2009 | Gatlin | 208/236 |
| 2009/0275488 A1 | 11/2009 | Zamora et al. | 507/236 |
| 2010/0077938 A1 | 4/2010 | Zamora et al. | 106/677 |
| 2010/0212905 A1 | 8/2010 | van Petegen | 507/236 |
| 2010/0252262 A1 | 10/2010 | Ekstrand et al. | 166/305.1 |
| 2010/0292108 A1 | 11/2010 | Kakadjian | 507/229 |
| 2010/0305010 A1 | 12/2010 | Falana et al. | 507/274 |
| 2010/0311620 A1 | 12/2010 | Kakadjian et al. | 507/266 |
| 2011/0001083 A1 | 1/2011 | Falana et al. | 252/178 |
| 2011/0005756 A1 | 1/2011 | van Petegen et al. | 507/236 |
| 2011/0240131 A1 | 10/2011 | Parker | 137/13 |
| 2011/0247821 A1 | 10/2011 | Thompson et al. | 507/267 |
| 2011/0284247 A1 | 11/2011 | Zamora et al. | 166/295 |
| 2011/0284248 A1 | 11/2011 | Zamora et al. | 166/295 |
| 2012/0071366 A1 | 3/2012 | Falana et al. | 507/202 |
| 2012/0071367 A1 | 3/2012 | Falana et al. | 507/203 |
| 2012/0071370 A1 | 3/2012 | Falana et al. | 507/233 |
| 2012/0073813 A1 | 3/2012 | Zamora et al. | 166/285 |
| 2012/0137752 A1 | 6/2012 | Morrow | 73/49.5 |

OTHER PUBLICATIONS

U.S. Appl. No. 13/247,985, filed Sep. 28, 2011, Veldman et al.
U.S. Appl. No. 13/109,712, filed May 17, 2011, Falana et al.
U.S. Appl. No. 13/102,053, filed May 6, 201, Falana et al.
U.S. Appl. No. 13/094,806, filed Apr. 16, 201, Zamora et al.
U.S. Appl. No. 13/052,947, filed Mar. 21, 2011, Kakadjian et al.
U.S. Appl. No. 13/102,053, filed May 6, 2011, Kakadjian et al.
U.S. Appl. No. 13/348,267, filed Jan. 11, 2012, Kakadjian et al.
U.S. Appl. No. 13/249,819, filed Sep. 30, 2011, Falana et al.
U.S. Appl. No. 13/348,279, filed Jan. 11, 2012, Falana et al.

* cited by examiner

ENHANCING DELAYING IN SITU GELATION OF WATER SHUTOFF SYSTEMS

BACKGROUND OF THE INVENTION

1. Field of the Invention

Embodiments of this invention relate to in situ shutoff gel compositions having controlled crosslinking properties and for methods for making and using the compositions.

More particularly, embodiments of this invention relate to in situ shutoff gel compositions having controlled crosslinking properties, where the compositions include a crosslinkable polymer system, a crosslinking system, a crosslink delay system and a solvent system. Embodiments of this invention also relate to methods for making and using the situ shut-off gel compositions.

2. Description of the Related Art

Certain formation include relatively high permeability zones and relatively low permeability zones and zone having moderate permeability. Poor areal conformance formations including high permeability streaks and high permeability anomalies within a formation matrix. Fluids introduced into such formations generally exhibit poor flow profiles and sweep efficiencies and have poor vertical or areal conformance.

A number of attempts to remedy such conformance problems exist. U.S. Pat. Nos. 3,762,476; 3,981,363; 4,018,286; and 4,039,029 to Gall or Gall et al describe various processes wherein gel compositions are formed in high permeability zones of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment zone of the formation and gel in situ.

An attempt to achieve delayed polymer gelation was U.S. Pat. No. 4,706,754 to Smith which describes a process for reducing formation permeability by using polyacrylamide gels in combination with a crosslinking agent and a carboxylic acid delaying agent. The delaying agent allows for the gelation solution to thoroughly mix and be placed in the desired treatment region up to about 24 hours before gelation occurs. However, it is often desirable to delay gelation for longer than 24 hours to enable a gel to be placed at distances from the injection well that takes longer than 24 hours to achieve.

U.S. Pat. No. 4,744,418 to Sydansk discloses that at temperatures below 140° F. (60° C.), gelation can be delayed by decreasing the amount of polymer hydrolysis. U.S. Pat. No. 4,844,168 also to Sydansk discloses that above temperatures of about 140° F. (60° C.) polyacrylamide autohydrolysis increases at a rate that is proportional to the increase in temperatures. Sydansk also discloses that delayed gelation can be achieved at temperatures above about 140° F. (60° C.) by utilizing polyacrylamide having less than 0.1% hydrolysis. Sydansk is able to achieve delays in gelation of up to about 168 hours at about 165° F. (74° C.) and up to about 20 hours at temperatures of about 219° F. (104° C.). However it is often desirable to delay gelation for longer than 168 hours at temperatures of about 165° F. (74° C.) and longer than 20 hours at temperatures of about 219° F. (104° C.). Therefore a need exists for a gelation process wherein gelation delays can be enhanced when reservoir temperatures exceed 165° F. (74° C.) and exceed 219° F. (104° C.).

More recently, U.S. Pat. No. 5,069,281 disclosed using buffers having pKa values between 3.5 and 6.8 made of a mono-carboxylic acid or mono-carboxylic acid salt or mixtures to control the crosslinking process of chromium with polyacrylamides having less than 0.1% of hydrolysis. U.S. Pat. No. 5,421,411 disclosed using mono-carboxylic and/or poly-carboxylic acid and derivatives to delay the crosslinking process of polyacrylamides with a degree of hydrolysis higher than 0.1%.

Thus, there is a need in the art for gel systems and processes that are capable of forming gels having a predetermined gelation rate, strength, and stability to satisfy particular demands of a subterranean hydrocarbon-bearing formation.

SUMMARY OF THE INVENTION

Embodiments of this invention provide shutoff based gel compositions including a crosslinkable polymer system, a crosslinking system, a crosslink delay system and a solvent system. The crosslinkable polymer system includes a polyacrylamide polymer or a plurality of polyacrylamide polymers having a degree of hydrolysis greater than or equal to ($\geq$) about 0.2%. The crosslink delay system includes a buffer subsystem having pKa between about 3.5 and about 6.8, where the crosslink delay system controls a gelation rate of gel compositions.

Embodiments of this invention provide methods for selectively plugging high permeability zones of a subterranean hydrocarbon-bearing formation penetrated by a well bore. The method improves matrix conformance in the formation and correspondingly improves flow profiles and sweep efficiencies of injected and/or produced fluids in the formation. The methods includes pumping into the zones an in situ polymer gel composition of this invention.

In embodiments of this invention, a gelation delay is predetermined based on certain formation properties. Some of these properties include formation temperature, formation permeability, formation porosity, a distance of the region(s) to be plugged are from the well bore and the volumetric rate at which gelation fluid is to be injected. The methods of this invention, then includes preparing a gelation composition of this invention and injecting the composition into the high permeability zone of the formation via the well bore. In certain embodiments, the injected composition displaces a fluid previously injected into the formation or previously existing in the formation. The gelation delaying system, which includes a buffering subsystem having a pKa value between about a 3.5 to about 6.8, functions: (1) to buffer a pH of the gel compositions of this invention so that ammonia generated by the initial hydrolysis reaction of the crosslinkable polymer system does not increase the solution pH, and (2) to compete with the polymer carboxylate groups for sites on the crosslinking agents in the cross-linking system so that the small amount of hydrolysis that occur before the buffer capacity is exceeded (e.g., due to formation temperatures) is not sufficient to cause gelation of the composition. These two functions inhibit gelation until the composition has propagated into the matrix. Gelation time delays are dependent on the molecular weight and polymer concentration in the composition, on the buffer type and concentration, and on the temperature of the subterranean formation. The penetration depth of the composition into the formation will depend on the gelation time, the formation permeability and porosity and the volumetric rate of gel composition injection into the formation. Once the composition enters the zone to be treated, the gel composition gels to form a continuous single-phase gel composition comprising a crosslinked polymer structure or network reducing or substantial reducing permeability within the treated zone(s) and in the matrix in general.

After treatment, fluids may be injected into and/or produced from the hydrocarbon-bearing regions of the formation in fluid communication with the well bore resulting in improved vertical or areal conformance and improved oil production. The gel is substantially incapable of flowing from the treated zones and is resistant to in situ degradation, making it permanent or substantially permanent.

The gel compositions of this invention can be prepared at the surface under controlled conditions and gelation can be delayed at temperatures in excess of 176° F. (80° C.) until the composition is in placed in the zone of the formation. The resulting gel has both the strength and stability to meet the demands of the treated formation.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

The term "matrix" refers to horizontal "zones" of distinctive subterranean material of continuous geologic properties which extend in the horizontal direction.

The term "vertical conformance" refers to a measure of a degree of geologic uniformity in permeability of a formation as one moves vertically across the formation.

The term "areal conformance" refers to a measure of a degree of geologic uniformity in permeability as one moves horizontally across the formation.

The term "flow profile" qualitatively describes a uniformity of fluid flow through a subterranean formation.

The term "sweep efficiency" refers to a quantitative analog of "flow profile."

The term "plugging" refers to a substantial reduction in permeability in a region of a formation.

The term "gel" refers to a continuous three-dimensional crosslinked polymeric network having an ultra high molecular weight. Gels are qualitatively defined as either "flowing" gels or "non-flowing" gels based on their ability to flow under the force of gravity, unconfined on the surface at ambient atmospheric conditions. A flowing gel flows under these conditions. A non-flowing gel does not. In the present invention, non-flowing gels and flowing gels are formulated to have sufficient properties to minimize or substantially eliminate propagation of the gels from confines of a desired treatment region into a less permeable adjoining region when injected into the subterranean treatment region.

The term "partially gelled solutions" refer to gelled solutions, which are more viscous than uncrosslinked polymer solutions such the partially gelled solutions are incapable of flowing into less permeable regions where no treatment is desired, but sufficiently fluid to displace pre-existing fluids in a desired treatment zone. The crosslinking system of the partially gelled solutions has reacted incompletely with the polymer, but is capable of continued reaction to completion thereafter, resulting in the desired structural gel.

The term "complex" refers to an ion or molecule containing two or more interassociated ionic, radical or molecular species. A complex ion as a whole has a distinct electrical charge while a complex molecule is electrically neutral.

The term "lb/bbl" means pounds per barrel.
The term "gpt" means gallons per thousand gallons.
The term "gptg" means gallons per thousand gallons.
The term "pptg" means pounds per thousand gallons.
The term "wt. %" means weight percent.
The term "vol. %" means volume per weight.
The term "w/w" means weight per weight.
The term "w/v" means weight per volume.
The term "v/v" means volume per volume.
The term "SG" means specific gravity. It must be noted that for fluids for which the SG is one or near one, wt. %, vol. %, w/w, w/v, and v/v all mean essentially the same thing and for an SG of 1, they are totally interchangeable.

DETAILED DESCRIPTION OF THE INVENTION

The inventors have found that a shutoff gel composition can be prepared that has controllable gelation delay times based on formation properties including temperature, distance of zones to be treated from the well bore, permeability and porosity, and a volumetric injection rate into the formation. The gelation delay time is an amount of time from composition preparation to composition gelation. Ideally, the delay time should be approximately the same amount of time that is required to place the composition into the formation zoned to be plugged. The compositions are prepared by admixing a crosslinkable polymer system, a crosslinking system, a crosslink delay system and a solvent system. The crosslinkable polymer system include a polyacrylamide polymer or a plurality of polyacrylamide polymers having a degree of hydrolysis greater than or equal to (≥) about 0.2%. The crosslink delay system includes a buffer subsystem having pKa between about 3.5 and about 6.8, where the crosslink delay system controls a gelation rate of gel compositions. The compositions of this invention are surprising in that the gelation onset, rate and ultimate gel properties may be controlled with the crosslink delay systems of this invention even for crosslinkable polymer systems that include polyacrylamide polymers having a degree of hydrolysis greater than or equal to about 0.2 and even as high as 15%. The prior art clearly teaches the need for acrylamide polymers having less than 0.1% hydrolysis otherwise the delay systems are ineffective to control of gelation and gel properties.

The resulting gelation composition is then injected into a subterranean formation via a borehole and may be displaced into a zone or zones to be treated by a subsequently injected displacement fluid such as fresh water or brine, if necessary. The total dissolved solids content in the solvent system is equal to or less than the solubility limit of the dissolved solids in solvent system. After the gelation delay time, the gel forms. The gel selectively plugs high permeability zones within the subterranean formation resulting in improved vertical or areal conformance and improved production.

The present process enables the practitioner to control gelation rate. Gelation rate is defined as the degree of gel formation as a function of time or, synonymously, the rate of crosslinking of the polyacrylamide in the gelation solution. The degree of crosslinking may be quantified in terms of gel fluidity and/or rigidity. Generally, gel fluidity decreases and gel rigidity increases as the number of crosslinks within a gel increases. The gelation delaying agent and buffer inhibit hydrolysis of the polyacrylamide and increase the time until significant gelation occurs. Gelation is delayed by the buffer subsystem which competes with the crosslinking subsystem for the polymer carboxylate for sites, thereby slowing the crosslinking reaction and because the hydrolysis of polyacrylamide is severely retarded in the pH range of about 3.5 to about 6.8. After the gel composition has been placed within the area to be treated, hydrolysis of the crosslinkable polymer system occurs. When the amount of ammonia released from the hydrolysis of the amide group on the polyacrylamide to form a carboxylate group exceeds the buffer capacity of the crosslink delay system, the pH of the composition will increase in situ, the composition will begin to gel.

Inert fillers such as crushed or naturally fine rock material or glass beads can also be added to the gelation solution to reinforce the gel network structure.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength of a non-flowing is defined as the coherence of the gel network or resistance to deformation under external forces. Gel strength of a flowing gel is defined as the resistance of the gel to filtration or flow. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular treatment region is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, packed-column flooding, and core flooding. The operable ranges of a number of gelation parameters and their correlation with the dependent variables are described below.

The lower temperature limit of the gelation solution at the surface is the freezing point of the solution and the upper limit is essentially the thermal stability limit of the polymer. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alkaline, i.e., greater than 7 to about 13. Increasing the pH within the prescribed range increases the rate of gelation.

The polymer concentration in the solution is generally about 1000 ppm up to the solubility limit of the polymer in the solvent or the rheological constraints of the polymer solution. In certain embodiments, the polymer concentration is between about 1000 and about 200,000 ppm. In other embodiments, the polymer concentration is between about 3000 ppm and about 100,000 ppm. Increasing the polymer concentration increases the gelation rate and ultimate gel strength at a constant ratio of polymer to crosslinking agent.

The ionic strength of the solvent is generally between that of deionized distilled water to that of a brine having an ion concentration approaching the solubility limit of the brine. Increasing the ionic strength of the solution may increase the gelation rate.

The weight ratio of acrylamide polymer to chromium III and carboxylate species comprising the mixture is about 1:1 to about 500:1. In certain embodiments, the weight ratio is between about 2.5:1 and about 100:1. In other embodiments, the weight ratio is between about 5:1 to about 40:1. Decreasing the ratio generally increases the gelation rate and up to a certain point generally increases the gel strength, especially at a constant high polymer concentration.

The degree of hydrolysis is between about 0.2% and about 15%. In certain embodiments. the degree of hydrolysis is between about 0.2% and about 10%. In certain embodiments. the degree of hydrolysis is between about 0.5% and about 10%. Within the preferred range, increasing the degree of hydrolysis increases the gelation rate. Increasing the molecular weight of the polymer increases the gel strength.

The relationships set forth above permit composition optimization and tailoring. The optimization and tailoring will involve adjusting the gel compositions of this invention to achieve a desired gelation rate and to achieve desired properties of the resultant gel, where the optimization and tailoring is directed to treatment demands of a given formation to be treated. The treatment demands include the in situ gelation conditions such as temperature, connate water properties, and permeability of the region as well as the post treatment conditions such as injection and production pressures. Analytical methods known to one skilled in the art are used to determine the treatment demands.

The gelation rate is advantageously sufficiently slow to enable preparing the gel compositions of this invention at the surface, injecting the composition as a uniform slug into the wellbore, and displacing a pre-existing fluid in the desired treatment zone. If the gelation rate is too high, the composition may be too excessively gelled at the surface making it difficult, if not impossible, to inject the composition into the wellbore and the formation due to its rheological properties. At the same time, the gelation rate must be sufficiently rapid to enable completion of the reaction within a reasonable period of time so that the well may be returned to injection or production after treatment.

When treating anomalies, at least partial gelation of the composition, if not complete gelation for some flowing gels, is advantageous before the composition reaches faces bounding the matrix and the anomaly to prevent the composition from penetrating the matrix as well as the anomaly. Substantial penetration of the matrix by the composition and the ensuing permeability reduction of the matrix are counterproductive to the plugging of anomalies. The values of the independent variables in the process are carefully selected to achieve a gelation rate meeting these criteria.

A volume of the composition injected into the formation is a function of a volume and location of the desired treatment region and a degree of penetration into the treatment region by the composition. One skilled in the art can determine the required volume of gel for a given treatment region. Placement of the gelation composition in the treatment region may be facilitated by zone isolation means such as packers and the like.

An injection rate is a function of the gelation rate and operational constraints of injection pressure and pumping limits. The injection rate is generally controlled to permit substantially all of the compositions to be injected before the composition becomes unpumpable. The gelation time of the gel ranges from near instantaneous for flowing gels up to about 48 hours or longer for both flowing and non-flowing gels. Longer gelation times are limited by practical considerations of lost production when injection and production wells are shut in.

The process is applicable to conformance treatment of formations under most conditions and is specific to treating regions within the formation which are in fluid communication with an injection or production well. Flowing gels are especially applicable to treating anomalies such as streaks of relatively high permeability, fractures or fracture networks that are in direct fluid communication via the borehole of the injection well. The flowing gel, as set forth above, have a sufficient crosslink density to remain in place under injection conditions in the anomaly, effectively plugging the anomaly.

Flowing gels are not generally suitable for treating anomalies in direct communication via the anomaly with production wells, because flowing gels do not have sufficient strength to withstand the drawdown pressure during production and may flow back into the wellbore. For treating anomalies in direct communication with production wells, non-flowing rigid gels are generally selected as they have sufficient strength to withstand the production drawdown pressure. In certain embodiments, the amount of gel flow back into the wellbore is negligible or substantially zero, when oil is produced after the conformance treatment.

In certain embodiments, a degree of partial gelation of an injected composition of this invention may be maintained sufficiently low to enable the composition to enter a selected high permeability zone of the matrix and crosslink to completion in situ as either a non-flowing gel or a flowing gel. Both flowing and non-flowing gels may be used for treatment of high permeability zones of the matrix, because in general neither will flow from the treatment zone upon complete gelation, a necessary condition for the present invention. In certain embodiments, non-flowing gels are preferred for treating high permeability zones in direct communication with production wells based on their increased strength.

Gels having a predetermined gelation rate and resultant gel properties to meet the treatment demands of a given region are produced by adjusting and setting the surface gelation conditions as they correlate to the gelation rate and gel properties. Accordingly the gels are produced in a manner which renders them insensitive to most extreme formation conditions. The gels can be applied to the treatment of many different geological structures including high permeability zones within the formation matrix and anomalies external to the matrix such as fractures and other cavities. The gels can be stable at formation temperatures as high as 115° C. and at any formation pH contemplated. The gels are relatively insensitive to the stratigraphy of the rock and can be employed in carbonate and sandstone strata and unconsolidated or consolidated strata having varying mineralogy. Once the gels are in place, it is extremely difficult to displace the gels by physical or chemical means other than total destruction of the crosslinked network. The gels may be reversible on contact with hydrogen peroxide or sodium hypochlorite, but are substantially insoluble in the formation fluids.

The following gel strength code and nomenclature are useful for interpreting the tables.

| | Gel Strength Code |
|---|---|
| A | No detectable gel formedsolution. |
| B | Highly flowing gel |
| C | Flowing gel |
| D | Moderately flowing gel |
| E | Barely flowing gel |
| F | Highly deformable nonflowing gel |
| G | Moderately deformable nonflowing gel |
| H | Slightly deformable nonflowing gel |
| I | Rigid gel |
| J | Ringing rigid gel |

| Nomenclature | |
|---|---|
| % Hydrolysis | % of carboxylate groups based on the total number of acrylamide groups |
| MW | average molecular weight |
| Polymer Conc. (ppm) | concentration of polymer in the solution |
| Polymer Solvent | aqueous solvent |
| Polymer pH | pH of the polymer solution |
| Total Ion Conc. (ppm) | Cr(III) and acetate ions |
| Weight Ratio Polymer:Ions | acrylamide polymer to Cr(III) and acetate ions |
| Metal Ion Conc. (ppm) | Cr(III) ion concentration |
| Temp (° C.) | gelation temperature |
| Time (hr) | gelation time |
| Gel Code | gel strength code |
| Viscosity (cp) | apparent viscosity of the gelation solution |
| Pressure (kPa) | viscometer pressure |

SUITABLE REAGENTS FOR USE IN THE INVENTION

Suitable polymers for use in the crosslinkable polymer systems of this invention include, without limitation, a partially hydrolyzed acrylamide polymer or mixture of partially hydrolyzed acrylamide polymers. The partially hydrolyzed acrylamide polymers comprise acrylamide polymers being hydrolyzed to a degree greater than or equal to about 0.2% (percent of acrylamide groups hydrolyzed to carboxylate groups). In certain embodiments, the degree of hydrolysis is greater than or equal to about 0.5%. In other embodiments, the degree of hydrolysis is between about 0.2% and about 15%. In other embodiments, the degree of hydrolysis is between about 0.5% and about 10%. The average molecular weight of the acrylamide polymer is generally in the range between about 10,000 and about 50,000,000. In certain embodiments, the acrylamide polymer has an average molecular weight between about 100,000 to about 20,000,000. In other embodiments, the acrylamide polymer has an average molecular weight between about 200,000 and about 12,000,000. In other embodiments, the acrylamide polymer has an average molecular weight between about 100,000 to about 11,000,000. In other embodiments, the acrylamide polymer has an average molecular weight between about 200,000 and about 1,000,000. In other embodiments, the acrylamide polymer has an average molecular weight between about 250,000 and about 300,000. The polyacrylamide has most preferably greater than about 0.1 mole % polymer carboxylate groups. The polymer concentration in the gelation compositions are generally between about 0.05% and 10% by weight. In certain embodiments, the polymer concentration is between about 1% and about 8% by weight. In certain embodiments, the polymer concentration is between about 2% and about 5% by weight of polymer in water.

Suitable crosslinking agents for use in the crosslinking systems of this invention include, without limitation, a polyvalent metal carboxylate complex crosslinking agent derived from a carboxylate compound or mixture thereof. In solution, the crosslinking agent comprises an electronegative carboxylate species, which may include one or more of the following water soluble species: formate, acetate, propionate, lactate, substituted derivatives thereof, and mixtures thereof. In addition to electronegative carboxylate species, the solution comprises electropositive metallic species such as $Al^{3+}$, $Fe^{3+}$, $Ti^{4+}$, $Zn^{2+}$, $Sn^{4+}$, $Cr^{3+}$, etc. In certain embodiments, the crosslinking agents are chromium (III) acetate complexes. The weight ratio of polymer to crosslinking agent is generally between about 5:1 and about 50:1. In certain embodiments, the ratio is between about 6:1 and about 20:1. In other embodiments, the ratio is between about 7:1 and about 10:1.

Suitable chromium III species include, without limitation, trivalent chromium and chromic ion, an equivalent term, carboxylate species derived from water-soluble salts of carboxylic acids. In certain embodiments, the carboxylic acids are low molecular weight mono-basic acids. Exemplary examples of such carboxylic acids include formic acid, acetic acid, propionic acid, lactic acid, lower substituted derivatives thereof and mixtures thereof. The carboxylate species include the following water-soluble species: formate, acetate, propionate, lactate, lower substituted derivatives thereof, and mixtures thereof. Optional inorganic ions include sodium, sulfate, nitrate and chloride ions. A non-exhaustive list of representative examples of chromic compounds include: $[Cr_3(CH_3CO_2)_6(OH)_2]^{1+}$, $[Cr_3(OH)_2(CH_3CO_2)_6]NO_3 \cdot 6H_2O$, $[Cr_3(Cr(H_2O)_2(CH_3CO_2)_6]^{3+}$, and $[Cr_3(H_2O)_2(CH_3CO_2)_6](CH_3CO_2)_3 \cdot H_2O$.

A host of complexes of the type described above and their method of preparation are well known in the leather tanning art. These complexes are described in Shuttleworth and Russel, Journal of The Society of Leather Trades' Chemists, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, Das Leder, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., Chromium, Volume 1: Chemistry of Chromium and its Compounds, Reinhold Publishing Corp., N.Y., 1956, pp. 229-233; and Cotton and Wilkinson, Advanced Inorganic Chemistry 3rd Ed., John Wiley & Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

The gelation delaying agent is a monocarboxylic acid or a monocarboxylic acid salt or mixtures thereof in sufficient concentration to raise or lower the pH of the aqueous gelation solution to about 3.5 to about 6.8, preferably about 3.5 to about 6 and most preferably about 3.5 to about 5. Exemplary acids include formic, acetic, propionic, lactic, etc. Exemplary acid salts include salts of formate, acetate, propionate, lactate, etc.

In addition to the delaying agent, the buffer is any water soluble buffer subsystem having a pKa value between about 3.5 and about 6.8. In certain embodiments, the buffer subsystem has a pKa value between about 3.5 and about 6. In other embodiments, the buffer subsystem has a pKa value between about 3.5 to about 5. Exemplary buffers include monocarboxylates such as formate, acetate, propionate and lactate salts, hydrogen phosphates and polyamines such as triethylene tetraamine, tetraethylene pentamine and hexamethylene tetraamine or mixtures thereof. Dicarboxylate and tricarboxylate buffers such as those based on the use of malonic, oxalic and citric acids should be avoided because the closely spaced dicarboxylates and tricarboxylates strongly chelate the chromium (III) gelation agent thereby preventing gelation.

A molar ratio of the delaying subsystem to the crosslinkable polymer subsystem ranges between about 0.1:1 and about 3.0:1. In certain embodiments, the molar ratio is between about 0.5:1 and—about 2.5:1. In certain embodiments, the molar ratio is between about 0.75 to 1 and about 2.0:1.

The crosslinkable polymer system, the crosslinking system, the crosslink delaying subsystem, and the solvent system can be mixed at or near the wellhead by in-line mixing means before or during injection. Or, the delaying system, polymer system and the solvent system can be admixed and then the crosslinking system added to form a bulk gel composition suitable for injection. Sequential injection should not be used because it results in inadequate mixing and subsequent incomplete gelation.

Suitable solvent system for use the present invention include, without limitation, fresh water or brine. Exemplary fresh water include tap water, production water, or any other source of free water. Exemplary brine include any water containing an inorganic or organic salt dissolved in the water including brines containing salts up their solubility limit in water.

EXPERIMENTS OF THE INVENTION

The following example demonstrates the practice and utility of the present invention but is not to be construed as limiting the scope thereof. The examples demonstrate successful testing of a gel composition of this invention including a acrylamide polymer having a degree of hydrolysis of about 5% and average molecular weight of about 500,000 g/mol. The gel compositions utilize a crosslink delay system including glacial acetic acid/ammonium acetate buffer having a pH of 4.5.

The gel compositions tested include a base solution include 22.5 lb/bbl comprising 75.00 wt. % ALCO-FLOOD™ 254s and 25.00 wt. % chromic acetate. The ALCOFLOOD™ 254s and chromic acetate are added to water with mixing. To the base solution is added differing amounts of a crosslink delay system comprising glacial acetic acid (72.63 wt. % acetic acid) and 60 wt. % of a 27.37 wt. % ammonium acetate solution. The source of chromic acetate is Chrome Acetate in powder form available from McGean under P.N. 35100-NE01 as chromium triacetate.

Example 1

Figure 1:
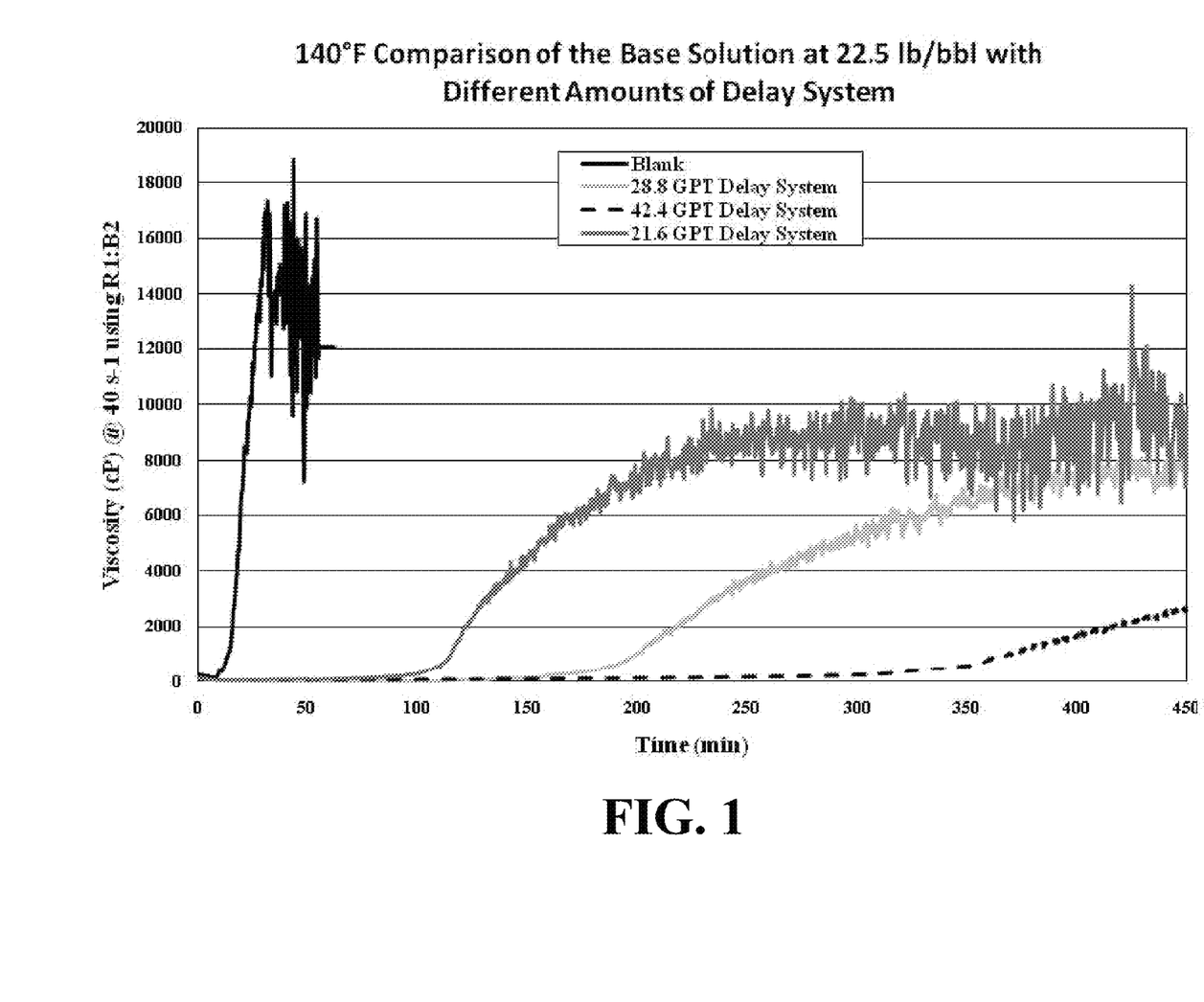
FIG. 1 depicts the effect of embodiments of crosslink delay systems of this invention in a gel composition including 25 wt. % of a chromic acetate crosslinking system at 140° F.

Three gel compositions of this invention were tested against a blank including no added crosslink delay system. The four gel compositions included: (1) 21.6 gpt of the crosslink delay system, (2) 28.8 gpt of the crosslink delay system, (3) 42.4 gpt of the crosslink delay system, with 6.56 wt. % of the base solution. FIG. 1 shows the effects of different amounts of the crosslink delay system added to the base solution @ 140° F. The results show that increasing amounts of the crosslink delay system delays the onset of gelation up to about 310 minutes at 42.4 gpt. The results show that at 21.6 gpt, the delay of gelation is about 100 minutes.

Example 2

Figure 2:
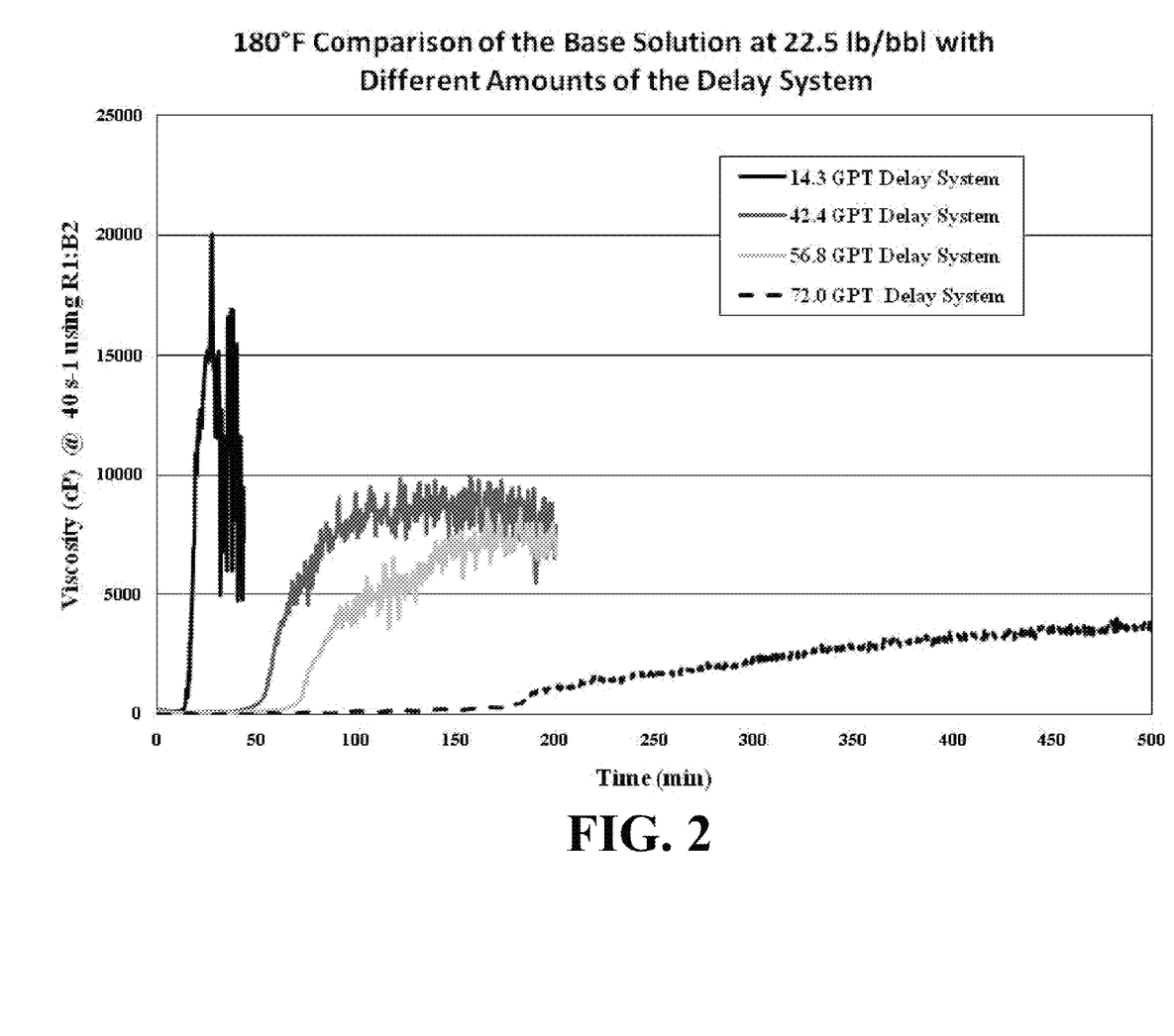
FIG. 2 depicts the effect of embodiments of crosslink delay systems of this invention in a gel composition including 25 wt. % of a chromic acetate crosslinking system at 180° F.

Four gel compositions of this invention were tested with different amounts of the crosslink delay system. The four gel compositions included: (1) 14.3 gpt of the crosslink delay system, (2) 42.4 gpt of the crosslink delay system, (3) 56.8 gpt of the crosslink delay system, and (4) 72.0 gpt of the crosslink delay system. FIG. 2 depicts the effects of different amounts of the crosslink delay system added to the base solution @ 180° F. The results show that increasing amounts of the crosslink delay system delays the onset of gelation from a time of about 25 minutes at 14.3 gpt of the crosslink delay system to more than about 150 minutes at 72 gpt.

Example 3

Figure 3:
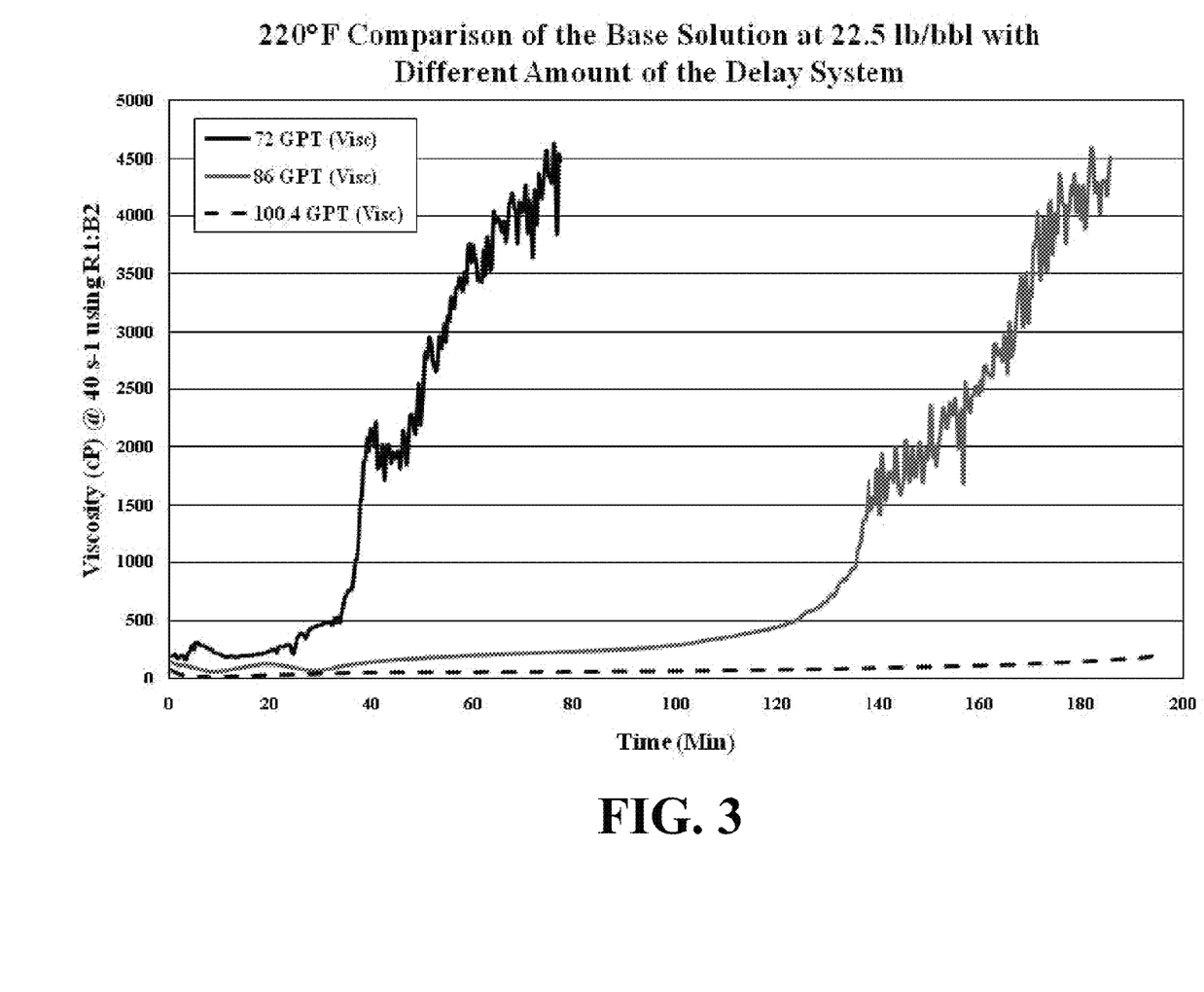
FIG. 3 depicts the effect of embodiments of crosslink delay systems of this invention in a gel composition including 25 wt. % of a chromic acetate crosslinking system at 220° F.

Three gel compositions of this invention were tested with different amounts of the crosslink delay system. The three gel compositions included: (1) 72 gpt of the crosslink delay system, (2) 86 gpt of the crosslink delay system, and (3) 100.4 gpt of the crosslink delay system. FIG. 3 depicts the effects of different amounts of the crosslink delay system added to the base solution @ 220° F. The results show that increasing amounts of the crosslink delay system delays the onset of gelation from a time of about 25 minutes at 72 gpt of the crosslink delay system to more than about 120 minutes at 100.4 gpt.

Example 4

Figure 4:
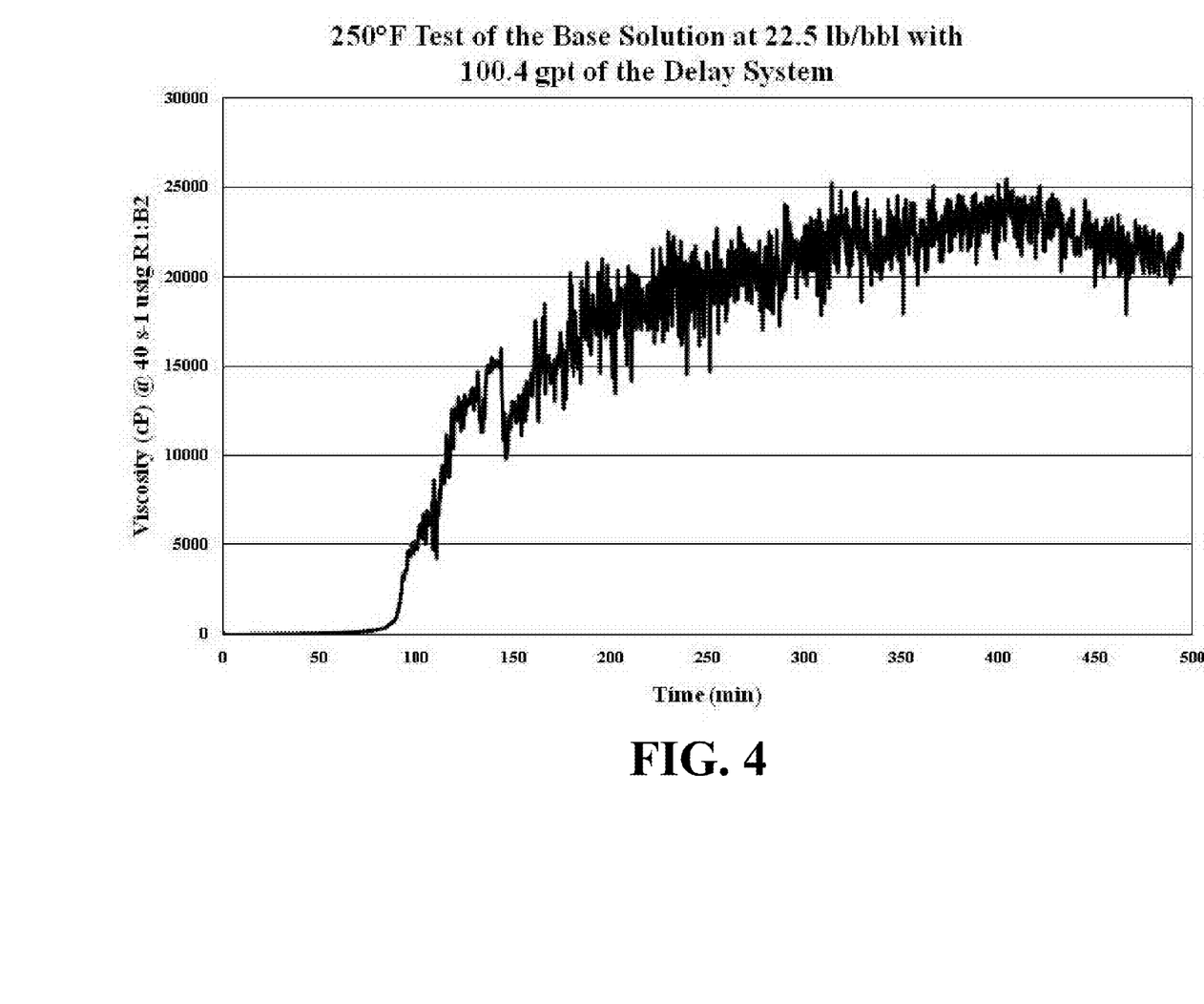
FIG. 4 depicts the effect of an embodiment of a crosslink delay system of this invention in a gel composition including 25 wt. % of a chromic acetate crosslinking system at 250° F.

A gel compositions including 100.4 gpt of the crosslink delay system was tested. FIG. 4 shows that even at 250° F., the crosslink delay system delays gelation onset up to about 100 minutes.

Example 5

Figure 5:
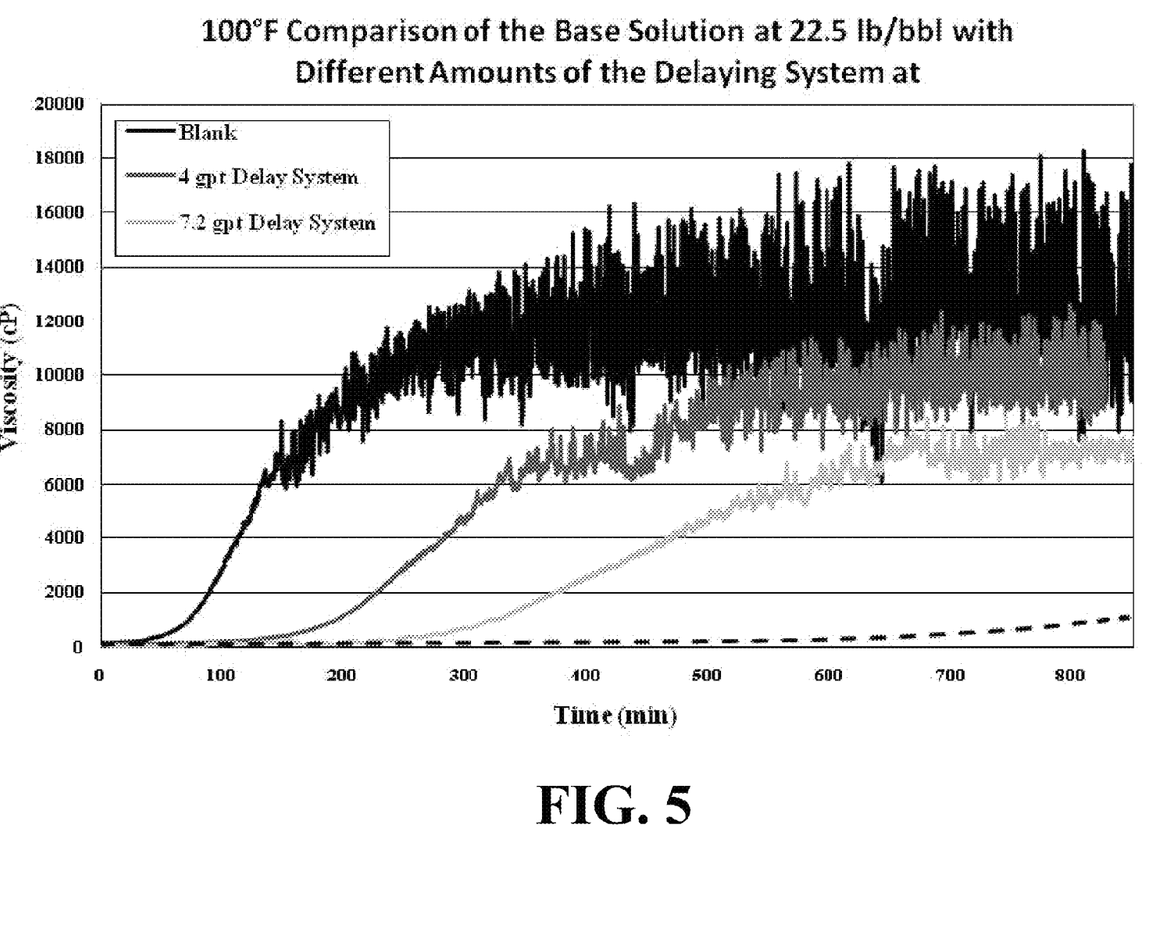
FIG. 5 depicts the effect of embodiments of crosslink delay systems of this invention in a gel composition including 25 wt. % of a chromic acetate crosslinking system at 100° F.

Three gel compositions of this invention including 6.48 wt. % of the base solution were tested with different amounts of the crosslink delay system compared to a blank—no added crosslink delay system. The three gel compositions included: (1) 4 gpt of the crosslink delay system, (2) 7.2 gpt of the crosslink delay system, and (3) 14.32 gpt of the crosslink delay system. FIG. 5 shows the that the delay time may be precisely tailored to a value as low at about 50 minutes to a value of more than 300 minutes.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for plugging a relatively high permeability zone in a subterranean formation comprising:

determining formation properties of a formation including at least one relatively high permeability zone, where the formation properties include at least temperatures of the zones, distances to the zones, permeabilities and porosities of the zones, and volumetric injection rates into the zones;

predetermining a gelation rate, a gel strength and a gel stability required of a gel composition to meet treatment demands of the formation to substantially shutoff the at least one relatively high permeability zone in the formation based on the formation properties;

providing the gel composition including a crosslinkable polymer system, a crosslinking system, a crosslink delay system and a solvent system, where the crosslinkable polymer system consists essentially of acrylamide polymers having a degree of hydrolysis between about 0.2% and 15% and an average molecular weight between about 200,000 and about 1,000,000, the crosslinkable polymer system is present in a concentration between about 1 wt. % and about 8 wt. %, the crosslink delay system comprises an acid, an acid salt or a mixture thereof, and a molar ratio of the crosslink delay system to the crosslinkable polymer system is between about 0.5:1 and about 2.5:1, adjusting relative amounts of the crosslinkable polymer system, the crosslinking system, the crosslink delay system, and the solvent system based on the formation properties so that the crosslink delay system is present in an amount sufficient to maintain a pH of the gel composition between about pH 3.5 and about pH 6.8 for a desired gelation delay time precisely tailored to a value between about 50 minutes and 300 minutes for the acrylamide polymers having the degree of hydrolysis between about 0.2% and 15% and the average molecular weight between about 200,000 and about 1,000,000;

injecting the composition into the formation under injection conditions sufficient for the composition to penetrate the at least one relatively high permeability zone; and crosslinking the composition substantially to completion in the at least one relatively high permeability zone at the predetermined gelation rate based on the relative amounts of the crosslinkable polymer system, the crosslinking system, the crosslink delay system and the solvent system to form a crosslinked gel having the predetermined gel strength and gel stability to substantially plug the at least one relatively high permeability zone, where the solvent system is fresh water or a brine and where the composition improves matrix conformance in the formation and correspondingly improves flow profiles and sweep efficiencies of the formation and where the formation is either a producing formation or an injection formation.

2. The method of claim 1, wherein the gel composition is partially gelled during injection so that the gel composition is sufficiently flowing to penetrate the at least one relatively high permeability zone but is sufficiently gelled to prevent substantial penetration of the at least one relatively low permeability zone.

3. The method of claim 1, wherein a rate of hydrocarbon production from the formation is substantially increased.

4. The process of claim 1, wherein the acid and acid salt are selected from the group consisting of formic acid, formate, acetic acid, acetate, propionic acid, propionate, lactic acid, lactate, lower substituted derivatives thereof, and mixtures thereof.

5. The process of claim 4, wherein the acid is acetic acid and the acid salt is acetate.

6. The process of claim 1, wherein the gel is a flowing gel.

7. The process of claim 1, wherein the gel is a non-flowing gel.

8. The process of claim 1, wherein the gel composition is substantially ungelled prior to injecting.

9. The process of claim 1, wherein the at least one relatively high permeability zone is an anomaly and at least one relatively low permeability zone is a matrix.

10. The process of claim 1, wherein the crosslinking system comprises at least one chromium III species.

11. The process of claim 1, wherein the crosslinkable polymer system consists essentially of acrylamide polymers having a degree of hydrolysis is between 0.2% and 10% and an average molecular weight between about 250,000 and about 300,000 and the crosslink delay system is present in an amount sufficient to maintain the pH of the gel composition between about pH 3.5 and about pH 6 for the desired gelation delay time.

12. The process of claim 1, wherein the crosslinkable polymer system consists essentially of acrylamide polymers having a degree of hydrolysis between 0.5% and 10% and an average molecular weight between about 250,000 and about 300,000, and the crosslink delay system is present in an amount sufficient to maintain the pH of the gel composition between about pH 3.5 and about pH 5 for the desired gelation delay time.

13. The process of claim 1, wherein the crosslinkable polymer system consists essentially of acrylamide polymers having a degree of hydrolysis is between about 0.2% and about 10%.

14. The process of claim 1, wherein the crosslinkable polymer system consists essentially of acrylamide polymers having a degree of hydrolysis is between about 0.5% and about 10%, and an average molecular weight is between about 250,000 and about 300,000.

15. The process of claim 1, wherein the crosslinkable polymer system consists essentially of acrylamide polymers having a degree of hydrolysis is between about 0.5% and about 10%, and an average molecular weight is 500,000.

16. The process of claim 1, wherein the polymers are present in a concentration between about 2 wt. % and about 5 wt. % and the molar ratio of the crosslink delay system to the crosslinkable polymer system is between about 0.75:1 and about 2.0:1.

17. The process of claim 1, wherein the fresh water comprises tap water, production water, or any other source of free water and where the brine comprises water containing an inorganic or organic salt dissolved in the water up to their solubility limit.

18. A method for plugging a relatively high permeability zone in a subterranean formation comprising:

determining formation properties of a formation including at least one relatively high permeability zone, where the formation properties include at least temperatures of the zones, distances to the zones, permeabilities and porosities of the zones, and volumetric injection rates into the zones;

predetermining a gelation rate, a gel strength and a gel stability required of a gel to meet treatment demands of the formation to substantially shutoff the at least one relatively high permeability zone in the formation based on the formation properties;

providing an aqueous gel composition including a crosslinkable polymer system, a crosslinking system, a crosslink delay system and an aqueous solvent system, where the crosslinkable polymer system consisting essentially of acrylamide polymers having a degree of hydrolysis between about 0.5% and 10% and an average molecular weight between about 200,000 and about 1,000,000, where the crosslinkable polymer system is present in a concentration between about 1 wt. % and about 8 wt. %, where the crosslink delay system comprises an acid, an acid salt or a mixture thereof, where a molar ratio of the crosslink delay system to the crosslinkable polymer system is between about 0.5:1 and about 2.5:1, and where the solvent system is fresh water or a brine;

adjusting relative amounts of the crosslinkable polymer system, the crosslinking system, the crosslink delay system, and the solvent system based on the formation properties so that the crosslink delay system is present in an amount sufficient to maintain a pH of the gel composition between about pH 3.5 and about pH 6 for a desired gelation delay time precisely tailored to a value between about 50 minutes and 300 minutes for the acrylamide polymers having the degree of hydrolysis 1,000,000;

injecting the composition into the formation under injection conditions sufficient for the composition to penetrate the at least one relatively high permeability zone; and crosslinking the composition substantially to completion in the at least one relatively high permeability zone at the predetermined gelation rate based on the relative amounts of the crosslinkable polymer system, the crosslinking system, the crosslink delay system and the solvent system to form a crosslinked gel having the predetermined gel strength and gel stability to substantially plug the at least one relatively high permeability zone, where the composition improves matrix conformance in the formation and correspondingly improves flow profiles and sweep efficiencies of the formation and where the formation is either a producing formation or an injection formation.

19. The method of claim 18, wherein the gel composition is substantially ungelled prior to injecting and wherein the gel composition is partially gelled during injection so that the gel composition is sufficiently flowing to penetrate the at least one relatively high permeability zone but is sufficiently gelled to prevent substantial penetration of the at least one relatively low permeability zone.

20. The method of claim 18, wherein a rate of hydrocarbon production from the producing formation is substantially increased and wherein the at least one relatively high permeability zone is an anomaly and at least one relatively low permeability zone is a matrix.

21. The process of claim 18, wherein the gel is a flowing gel or a non-flowing gel.

22. The process of claim 18, wherein:
the acid and acid salt are selected from the group consisting of formic acid, formate, acetic acid, acetate, propionic acid, propionate, lactic acid, lactate, lower substituted derivatives thereof, and mixtures thereof,
the crosslinking system comprises at least one chromium III species,
the polymers are present in a concentration between about 2 wt. % and about 5 wt. %,
the molar ratio of the crosslink delay system to the crosslinkable polymer system is between about 0.75:1 and about 2.0:1,
the fresh water comprises tap water, production water, or any other source of free water, and
the brine comprises water containing an inorganic or organic salt dissolved in the water up to their solubility limit.

23. The process of claim 22, wherein:
the crosslinkable polymer system consists essentially of acrylamide polymers having the degree of hydrolysis and an average molecular weight is between about 250,000 and about 300,000, and
the crosslink delay system is present in an amount sufficient to maintain the pH of the gel composition between about pH 3.5 and about pH 5 for the desired gelation delay time.

* * * * *